United States Patent Office 3,660,365
Patented May 2, 1972

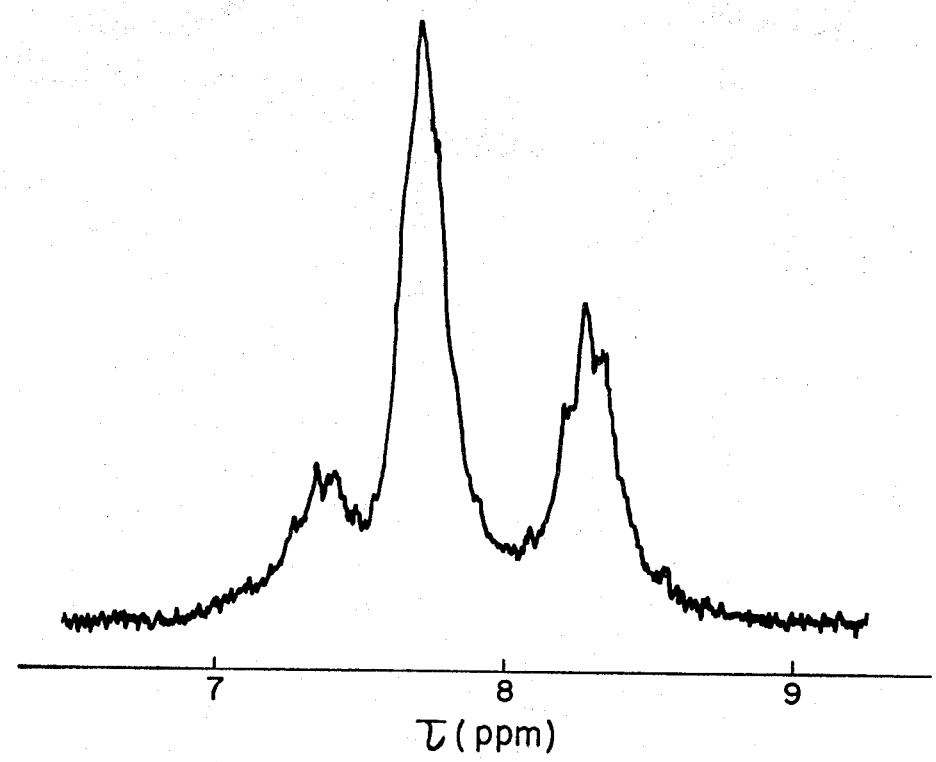

3,660,365
PRODUCTION OF ALTERNATING COPOLYMERS OF BUTADIENE AND ACRYLONITRILE USING MANGANESE CHELATE, ZINC HALIDE AND MODIFIER
Akira Onishi, Koichi Irako, and Yoshihiro Hayakawa, Tokyo, Takeshi Shimomura, Kobe, and Koichi Iwami and Shoji Miyamoto, Tokyo, Japan, assignors to Bridgestone Tire Company Limited, Tokyo, Japan
Filed Oct. 28, 1969, Ser. No. 871,926
Claims priority, application Japan, Nov. 4, 1968, 43/79,877
Int. Cl. C08f 1/48
U.S. Cl. 260—82.5
6 Claims

ABSTRACT OF THE DISCLOSURE

Alternating copolymers of a conjugated diene and a conjugated polar vinyl monomer, wherein the conjugated diene unit and the conjugated polar vinyl monomer unit are bonded substantially alternately, are produced by copolymerizing said conjugated diene with said conjugated polar vinyl monomer in the presence of a catalyst prepared from a component (A) of at least one metal chelate complex compound selected from the group consisting of metal chelate complex compounds having the general formula $$MeL_n$$

wherein Me represents manganese, cobalt or copper metal, $n$ represents the valence of Me and L represents a ligand of 1,3-dicarbonyl compound and a component (B) of at least one zinc halide selected from the group consisting of zinc chloride and zinc bromide. Furthermore, the molecular weight of the alternate copolymer can be controlled and the gelation of the polymerization product can be inhibited by adding a modifier selected from the group consisting of thiol compounds and iodoform to the above polymerization reaction system.

---

The present invention relates to a process for producing alternating copolymers of conjugated dienes and conjugated polar vinyl monomers. More particularly the first aspect of the present invention consists in a process for producing alternating copolymers of at least one conjugated diene and at least one conjugated polar vinyl monomer, wherein the conjugated diene unit and the conjugated polar vinyl monomer unit are bonded substantially alternately, which comprises copolymerizing at least one monomer selected from conjugated dienes having 4 to 10 carbon atoms and at least one conjugated polar vinyl monomer selected from the group consisting of acrylonitrile, methacrylonitrile and α,β-unsaturated carboxylic acid esters in liquid state in the presence of a catalyst prepared from a component (A): at least one metal chelate complex compound selected from metal chelate complex compounds having the general formula

$$MeL_n$$

wherein Me represents a metal selected from the group consisting of manganese, cobalt and copper, $n$ represents the valence of Me and L represents a ligand selected from 1,3-dicarbonyl compounds, and
a component (B): at least one zinc halide selected from the group consisting of zinc chloride and zinc bromide.

The second aspect of the present invention consists in a process for controlling the molecular weight and inhibiting the gelation in the production of the above described alternating copolymers, which comprises copolymerizing the conjugated diene and the conjugated polar vinyl monomer in the presence of at least one modifier selected from the group consisting of thiol compounds and iodoform by using the above described catalyst system.

The term "alternating copolymer" to be used in the invention means a copolymer having a configuration in which the donor monomer unit (conjugated diene unit) and the acceptor monomer unit (conjugated polar vinyl monomer unit) are arranged substantially alternately, and further means a multi-component alternating copolymer having the same configuration.

Recently, copolymerization of a conjugated diene and a conjugated polar vinyl monomer has been prepared in order to develop ordinarily used rubber having an excellent oil resistance and weather resistance. Particularly, butadiene/acryonitrile copolymers are important in rubber industry. It has hitherto been known that the conventional methods of producing the above-mentioned copolymers are ones producing random copolymers by the use of free radical initiators, such as peroxy-compound and azo-compounds.

While, it has been known that complex compounds have various characteristic reactivities different from the reactivity of the above free radical intitiator can be also used as an initiator (Japanese patent application Publication No. 16,797/64). Such specific reactivity of the metal chelate complex compounds has been disclosed specifically in the above Japanese patent application Publication No. 16,797/64. For example, there is a description in the above Japanese patent application Publication No. 16,797/64 that when butadiene is polymerized in the presence of a cobalt (III) triacetylacetonate catalyst, polybutadiene having a high as 90% of cis-1,4 bond is produced. Furthermore, there are various reports other than the report disclosed in the above Japanese patent application Publication No. 16,797/64 with respect to the specificity of the metal chelate complex compound in a copolymerization reaction. For example, A. F. Nikolayev et al. have been reported with respect to the variation of valence of the central metal in a metal chelate complex compound and to the specific reactivity of the compound due to the variation of valence of the central metal in a copolymerization reaction of styrene and vinyl acetate (Polymer Science U.S.S.R., vol. 10, No. 8, 2094 (1968)). Moreover, it has been evidently shown in many reports that metal chelate complex compounds have a specific reactivity, that the variation of the valence of central metal influences the polymerization-initiating activity of the metal chelate complex compound, and that the polymerization-initiating activity of the metal chelate complex compound has a selectivity against the kind of monomers (for example, E. G. Kasting et al., Angewandte Chemie. 77 (7), 313–318 (1965); C. H. Bamford, F.R.S. and D. J. Lind, Proc. Roy, Soc. A. 302, 145–165 (1968); etc.

It can be seen from a series of patents that many investigations for applying the metal chelate complex compound having such specific reactivity in a commercial production of copolymers have been made by Badische Aniline & Soda Fabrik and others (Dutch patent application Nos. 6509,932, 6503,177 and 6515,633; German Pat. No. 1,176,864; French Pat. No. 1,360,001; German Pats. Nos. 1,181,913 and 1,180,522).

However, none of the above-mentioned series of patents disclosed methods of producing alternating copolymers of a conjugated diene and a conjugated polar vinyl monomer with the use of the specific reactivity of the metal chelate complex compound, and suggests such methods. For example, a method of increasing the catalytic activity of metal chelate complex compound catalyst of a metal of the Groups IV–VIII in the Periodic Table by adding a

chelate complex compound or a salt of a metal of the Groups I–III in the Periodic Table to a homopolymerization or copolymerization system of various monomers in the presence of the above-mentioned metal chelate complex compound catalyst is described in German Pat. No. 1,181,913. However, as shown in Example 4 of the above German Pat. No. 1,181,913, when butadiene and n-butyl acrylate are copolymerized, alternating copolymers are not formed. Further, even when a copolymerization reaction of butadiene and acrylonitrile, which was not described in the above German Pat. No. 1,181,913 at all, was tried in the presence of a combination catalyst system composed of a metal chelate complex compound of the Groups IV–VIII and a zinc halide, which is one of the catalyst systems described in the above German Pat. No. 1,181,913, alternating copolymers were not substantially formed by the use of the catalytic amount described in the above German Pat. No. 1,181,913. This will be explained hereinafter more specifically.

The German Pat. No. 1,181,913 discloses that the catalyst is used in an amount of 0.001–5% by weight, preferably 0.01–1% by weight based on the amount of monomers. However, when butadiene and acrylonitrile are copolymerized in the presence of a combination catalyst of zinc chloride and manganese (III) triacetylacetonate in the above described amount, the copolymer obtained in a sufficient conversion is too low in the degree of alternation (defined later) to provide the physical properties which are characteristics of the alternating copolymer obtained in the process of the present invention as described hereinafter. The upper limit of the catalytic amount described in the above German Pat. No. 1,181,913 is 5% by weight based on the amount of monomer. For example, the upper limit amount of the catalyst based on 1 mole of a monomer mixture composed of acrylonitrile and butadiene in a molar ratio of 4.0, even when the catalyst consists only of zinc chloride, is 19.5 mmoles of zinc chloride in the maximum amount, resulting a molar ratio of zinc chloride to acrylonitrile being 0.0244. Further, the ratio of zinc chloride to acrylonitrile highly influences the degree of alternation. For example, butadiene and acrylonitrile were copolymerized in the following polymerization recipe, and the influence of the molar ratio of zinc chloride to acrylonitrile upon the degree of alternation was examined.

The term "degree of alternation" used herein means an indication with respect to the arrangement of monomer units in the copolymer. This "degree of alternation" can be determined by nuclear magnetic resonance spectrum as described later.

Polymerization recipe:
    Acrylonitrile—400 mmoles
    Butadiene—100 mmoles
    Manganese (III) triacetylacetonate—1 mmole
    Zinc chloride—variable
    Polymerization temperature—30° C.

The degree of alternation of the copolymers obtained in the above polymerization recipe was analyzed to obtain a result as shown in the following table.

| $ZnCl_2/AN$ [1] (molar ratio) | Polymerization time (min.) | Conversion [2] (percent) | $[\eta]$ [3] (dl./g.) | AN content [4] in copolymer (mol percent) | Degree of alternation (percent) |
|---|---|---|---|---|---|
| 0.01 | 400 | 30.7 | 1.04 | 51.2 | 76.8 |
| 0.02 | 270 | 37.4 | 1.12 | 51.3 | 75.8 |
| 0.025 | 150 | 26.8 | 1.01 | 51.6 | 87.1 |
| 0.05 | 120 | 41.9 | 1.29 | 50.8 | 89.5 |

[1] Acrylonitrile.
[2] Conversion is shown by the yield based on the theoretical yield of a copolymer composed of 1:1 monomer units.
[3] $\eta$ is an intrinsic viscosity measured in dimethylformamide at 30° C.
[4] Acrylonitrile content in copolymer is shown by the percentage of acrylonitrile unit contained in the copolymer calculated from elementary analysis.

As seen from the above table, the degree of alternation does not exceed 87% until zinc chloride is used in such an amount that the molar ratio of zinc chloride to acrylonitrile is more than 0.025. That is, alternating copolymers are not substantially formed in the method described in German Pat. No. 1,181,913.

As described above, it is evident that the catalytic amount, particularly, the amount of component (B) to be used in this invention is a decisively important factor in the alternating copolymerization reaction of butadiene and acrylonitrile. Moreover, the degree of alternation of the resulting copolymer influences highly the physical properties of the copolymer itself. For example, when butadiene and acrylonitrile are copolymerized, the degree of alternation of the resulting copolymer varies depending upon the variation of the amount of component (B) to be used, and this difference of the degree of alternation between the resulting copolymers causes entirely different physical properties between these copolymers as described hereinafter.

Furthermore, it has not hitherto been known with respect to production of the above described alternating copolymers by using iodoform and thiol compounds as a modifier. For example, there is a description in German Pat. No. 1,180,522 that iodoform is used as an activator for metal chelate complex compounds. However, iodoform does not act as an activator upon the catalyst consisting of the components (A) and (B) according to the present invention, but it decreases the catalytic activity. That is, iodoform is used in an object entirely different from that of the present invention. Dutch patent application No. 6,509,932 discloses the use of thiol compounds at emulsion polymerization. Namely, iodoform and thiol compounds are not used for alternating copolymerization.

It has been surprisingly found that the modifier of the present invention has effects for inhibiting the gelation and controlling the molecular weight without deteriorating the alternating copolymerizability of the catalyst system according to the present invention.

There have hitherto been known neither methods of producing alternating copolymers of a conjugated diene and a conjugated polar vinyl monomer by using a metal chelate complex compound having a specific reactivity, nor methods of controlling the molecular weight of the resulting alternating copolymer and inhibiting the gelation by using the above-mentioned modifiers.

Recently, investigations with respect to alternating copolymers of a conjugated diene and a conjugated polar vinyl monomer have been made, and various catalyst systems are reported. For example, an alternating copolymerization reaction of butadiene with acrylonitrile in the presence of ethylaluminum dichloride single component catalyst (French Pat. No. 1,487,211) or a catalyst composed of ethylaluminum dichloride and vanadyl trichloride (Polymer Letter, vol. 7, 47 (1969)), and an alternating copolymerization reaction of isoprene with acrylonitrile and that of butadiene with acrylonitrile in the presence of a catalyst composed of zinc chloride and a peroxy-compound, such as tert-butyl peroxypivalate (Norman G. Gaylord et al., the 155th ACS National Meeting (April 1969), Division of Industrial and Engineering Chemistry, Lecture No. 69), have been reported. Further, copolymerization reaction of a conjugated diene and a conjugated polar vinyl monomer in the presence of a catalyst composed of a Friedel-Crafts halide and a free radical initiator, such as an azo-compound or a peroxy-compound, is disclosed in U.S. Pat. No. 3,278,503. However, there is no clear description with respect to the production of alternating copolymers in the above U.S. Pat. No. 3,278,503.

The process of the present invention has various advanges as compared with the above-mentioned conventional methods. For example, in the process of this invention, it is not necessary to use expensive and dangerous alkylaluminum compounds, which are used in an ethylaluminum dichloride mono-component catalyst system or in a combination catalyst system composed of ethylaluminum dichloride and vanadyl chloride, and the catalyst of this invention has a very high activity at the alternating copolymerization reaction. Therefore, the copolymerization reaction can be easily carried out in a commercial scale to produce alternating copolymers inexpensively.

In the above U.S. Pat. No. 3,278,503, a Friedel-Crafts halide and a free radical initiator, such as an azo-compound or a peroxy-compound are used. On the contrary, in the present invention, a zinc halide and a metal chelate complex compound are used. It has been found that when a copolymerization reaction of butadiene and acrylonitrile is carried out in the presence of a combination catalyst composed of aluminum trichloride or stannic chloride, which is typical as a Friedel-Crafts halide and is used instead of a zinc halide, and manganese (III) triacetylacetonate as a metal chelate complex compound, the copolymerization reaction does not substantially proceed under a condition to be used in this invention. That is, the combination catalyst of a zinc halide and a metal chelate complex compound according to this invention has a specific reactivity and further shows a very high activity at the copolymerization reaction, and consequently this combination catalyst of this invention is very different from the zinc halide system catalyst disclosed in the above U.S. Pat. No. 3,278,503 in the reactivity under the same condition. For example, even when a solution copolymerization of butadiene with acrylonitrile is effected in the presence of a zinc chloride-manganese (III) triacetylacetonate system catalyst under such a condition that the copolymerization does not substantially occur in the presence of a zinc chloride-azobisisobutylonitrile system catalyst or a zinc chloride-benzoyl peroxide system catalyst shown in Comparative Examples 2–5, an alternating copolymer containing no gel can be obtained in a yield of 41.9%. Furthermore, the gelation of the polymerization product by the use of the catalyst system of this invention is extremely smaller than that by the use of the catalyst system disclosed in the above U.S. Pat. No. 3,278,503. Therefore, the process of the present invention is remarkably improved from conventional well-known processes.

The process of the present invention has above-described various merits in the production of alternating copolymers of a conjugated diene and a conjugated polar vinyl monomer. Moreover, the obtained copolymers have remarkable characteristics which have never been observed in the conventional random copolymers. These excellent properties of the alternating copolymers of the present invention superior to those of the conventional random copolymers will be explained hereinafter with respect to butadiene/acrylonitrile copolymer.

(1) The alternating copolymer has a lower glass transition temperature in uncured state than the random copolymer having the same butadiene unit content, and therefore the alternating copolymer is superior to the random copolymer in the property at low temperature.

(2) Compounds were prepared according to the following recipe and then cured at 145° C. for 60 minutes.

| | Parts |
|---|---|
| Copolymer | 100 |
| Carbon black SRF | 45 |
| Zinc white | 5 |
| Stearic acid | 1 |
| Phenyl-β-naphthylamine | 1 |
| Sulfur | 1.5 |
| Accelerator NOBS sp. | 1 |

Next, physical properties of the compounds, in which commercially available random copolymer and the alternating copolymer obtained by the present invention were used respectively, were measured in the cured state. The results are shown in the following table together with the compositions of the alternating copolymer and the random copolymer used.

| | Alternating copolymer [1] | Random copolymer |
|---|---|---|
| Composition of copolymer: | | |
| Acrylonitrile content | 48.6 | 48 |
| Degree of alternation | 94.0 | [2] >85 |
| Physical property of compound: | | |
| (a) Original state: | | |
| Hardness (JIS) | 70 | 84 |
| 100% modulus (kg./cm.$^2$) | 45 | 102 |
| Tensile strength (kg./cm.$^2$) | 222–222 | 191 |
| Elongation (percent) | 420 | 235 |
| (b) Oil resistance: [3] | | |
| Swell (percent) | 114 | 115 |
| Tensile strength (kg./cm.$^2$) | 143–143 | 93 |
| Elongation (percent) | 320 | 168 |

[1] Intrinsic viscosity in dimethylformamide at 30° C. is 1.74.
[2] The copolymer contained gel, and an accurate determination was impossible.
[3] Oil=JIS "B," room temperature×48 hours. "B"=Isooctane/toluene (70/30).

As seen from this result, it can be seen that the butadiene/acrylonitrile alternating copolymer has a small hardness and modulus and a considerably large tensile strength and elongation. Furthermore, tensile strength and elongation after swollen are extremely large, and the impact resilience of the alternating copolymer at 60° C. was 165% of the impact resilience of the commercially available random copolymer.

As described above, the alternating copolymers of the present invention having such high degree of alternation possess the characteristics, which are presumably due to their regular alternating structure and cannot be considered from the random copolymer, and have desirable excellent properties to be used for rubber. Furthermore, the alternating copolymers having such high degree of alternation cause orientation crystallization.

The conjugated dienes to be used in the present invention are ones having 4–10 carbon atoms and the typical examples are butadiene, isoprene, pentadiene, hexadiene, 2,3-dimethyl-butadiene and phenyl-butadiene, and mixtures of two or more of these compounds. Among them, butadiene and isoprene are preferable, and butadiene is particularly preferable.

The conjugated polar vinyl monomers to be used in the present invention include acrylonitrile, methacrylonitrile, and α,β-unsaturated carboxylic acid esters, for example, methyl acrylate, ethyl acrylate, propyl acrylate, butyl acrylate, methyl methacrylate, ethyl methacrylate, and mixtures thereof. Among them, methyl methacrylate and acrylonitrile are preferable, and acrylonitrile is particularly preferable.

It is not always necessary to use monomers having such a high purity that have been used for solution polymerization in the present invention, but monomers having such a low purity that have been used in emulsion polymerization may be used. Furthermore, raw products of petroleum chemistry may be used. For example, $C_4$-fraction, such as mixtures of butadiene, butane and olefins may be used as such.

As combinations of monomers to be used in the copolymerization, mention may be made of butadiene/acrylonitrile, butadiene/methyl methacrylate, butadiene/methacrylonitrile, isoprene/acrylonitrile, isoprene/methyl methacrylate, pentadiene/acrylonitrile, 2,3-dimethylbutadiene/acrylonitrile, butadiene/ethyl methacrylate, butadiene/acrylonitrile/butyl acrylate, butadiene/acrylonitrile/methyl methacrylate, etc. Among them, combinations of butadiene and a conjugated polar vinyl monomer are preferable, and a combination of butadiene and acrylonitrile is most preferable.

The proportion of the conjugated polar vinyl monomer to the conjugated diene to be used for the copolymerization reaction should be selected so as that the resulting copolymer has an alternating structure. The molar ratio of the conjugated polar vinyl monomer to the conjugated diene is from about 0.25 to 4.0, preferably from 0.66 to 2.33, and most preferably from 1.00 to 2.33.

For example, when butadiene and acrylonitrile are copolymerized, copolymers having a degree of alternation of more than 86% is usually obtained in a molar ratio of acrylonitrile to butadiene of about from 0.25 to 4.0, and further it was found that a more improved degree of alternation can be obtained at a molar ratio of acrylonitrile to butadiene of about 1.00. The molar ratio of acrylonitrile to butadiene influences yield, degree of polymerization and gel content in addition to the degree of alternation of the resulting copolymer. Therefore, a molar ratio of acrylonitrile to butadiene of from 0.66 to 2.33 is preferably used in order to obtain alternating copolymers having a high degree of alternation and other excellent physical properties, and a molar ratio of from 1.00 to 2.33 are most preferably used in order to obtain alternating copolymers having a degree of alternation of more than 90%. When an excess amount of acrylonitrile is used in the above copolymerization of butadiene and acrylonitrile, a solution copolymerization can be carried out without using other solvents.

The catalytic component (A) to be used in the present invention is at least one metal chelate complex compound selected from metal chelate complex compounds having the general formula $$MeL_n$$

wherein Me represents a metal selected from the group consisting of manganese, cobalt and copper, $n$ represents the valence of Me and L represents a ligand selected from 1,3-dicarbonyl compounds. Examples of the 1,3-dicarbonyl compounds represented by L include ethylacetoacetate, acetylacetone, acetylacetophenone, 3-methyl-1-butenyl-3 acetoacetate, benzoylacetophenone, α-dihydropiranylacetylacetone, α-propenylacetylacetone, α-(1-butenyl)acetylacetone, α-(2-methyl-1-propenyl)acetylacetone, methylacetoacetate, propylacetoacetate, butylacetoacetate, propionylacetone, butyrylacetone, caproylacetone, 1,1,1-trifluoroacetylacetone, etc.

Among these metal chelate complex compounds, chelate complex compounds of manganese (III) are preferable, and manganese (III) triacetylacetonate is particularly preferable.

The catalytic component (B) to be used in the present invention is at least one zinc halide selected from the group consisting of zinc chloride and zinc bromide.

A particularly preferable catalyst system to be used in the present invention is a catalyst system consisting of zinc chloride and manganese (III) triacetylacetonate.

The amount of the component (A) to be used in the invention can be varied within a broad range, and in general, the molar ratio of the component (A) to the component (B) is from 0.2 to 0.00001, and preferably from 0.1 to 0.0001. When the above molar ratio is varied at the copolymerization reaction of, for example, butadiene and acrylonitrile, the catalytic activity and the molecular weight of the resulting copolymer can be somewhat controlled.

The amount of the component (B) is very important in the alternating copolymerization of a conjugated diene and a conjugated polar vinyl monomer in the present invention as described above. When butadiene and acrylonitrile are copolymerized, the amount of the component (B) influences the degree of alternation of the resulting alternating copolymer, which has a high influence upon the physical property of the copolymer, and further influences the activity of the catalyst, and the degree of polymerization and gel content of the copolymer. In general, the molar ratio of the component (B) to the conjugated polar vinyl monomer is from 0.025 to 0.20, and more preferably from 0.04 to 0.20. When the molar ratio is increased, alternating copolymers having a higher degree of alternation can be obtained. However, when the molar ratio is beyond 0.20, the catalytic activity is too high to control the copolymerization reaction, and the gel formation is too large to be prevented. In the copolymerization of butadiene and acrylonitrile, furthermore, when the molar ratio of acrylonitrile to butadiene is within the range of from 1.0 to 2.33 and at the same time the molar ratio of the component (B) to acrylonitrile is within the range of from 0.04 to 0.20, copolymers having a degree of alternation of more than 90% and trans-1,4 bond of butadiene unit of more than 93% can be obtained.

The method of the present invention can be carried out more effectively by using a modifier having an activity for controlling the molecular weight of the resulting polymers and inhibiting gel formation.

For example, when the viscosity of the reaction system is regulated, then reactors can be designed more easily, temperature can be easily controlled, stirring can be carried out more easily and the amount of diluent to be used can be decreased, and consequently copolymerization reactions can be carried out remarkably and economically. More over, a copolymerization reaction can be continued until a copolymer is obtained in a high yield without formation of copolymers having an excessively high molecular weight, and the copolymerization reaction can be carried out more economically. There are various merits other than the above-mentioned merits in the use of the modifier. One of the merits is that Mooney viscosity of the resulting copolymer, which has an influence upon the processability and various physical properties of the copolymer, can be regulated by controlling the molecular weight of the copolymer. Another particularly remarkable merit is that when the modifier of the present invention is used in the copolymerization of butadiene and acrylonitrile, soluble butadiene/acrylonitrile copolymers can be obtained.

The modifier to be used in this invention is at least one compound selected from the group consisting of thiol compounds and iodoform. The thiol compound includes methanethiol, ethanethiol, n-propanethiol, sec-propanethiol, n-butanethiol, sec-butanethiol, isobutanethiol, tert-butanethiol, n-pentanethiol, sec-pentanethiol, tert-pentanethiol, isopentanethiol, n-hexanethiol, tert-hexanethiol, n-heptanethiol, tert-heptanethiol, n-octanethiol, tert-octanethiol, tert-nonanethiol, n-decanethiol, n-dodecanethiol, tert-dodecanethiol, n-tetradecanethiol, tert-tetradecanethiol, n-hexadecanethiol, tert-hexadecanethiol, n-octadecanethiol, ethanedithiol, 1,6-hexanedithiol, dodecanedithiol, 3-ethoxypropanethiol, 2-ethoxypropanethiol, thiobenzoic acid, ethyl thioglycolate, benzylmercaptan, thioacetic acid, dodecylbenzylmercaptan, thiomalic acid, thiolactic acid, etc., and mixtures thereof.

Furthermore, mercaptan compounds having amino group, hydroxyl group, chloro group or carboxyl group together with mercapto group, such as 4-aminothiophenol, 4-mercaptobenzylchloride, 4-mercaptophenol, p-chloromethylthiophenol, 3-mercaptopropanol, etc., and mixtures thereof may be used.

Among them, aliphatic thiol compounds having 1–20 carbon atoms and iodoform are preferable, and tert-butanethiol, n-butanethiol, thiomalic acid, thiolactic acid, thioacetic acid, n-dodecanethiol, tert-dodecanethiol, n-hexadecanethiol, n-tetradecanethiol and iodoform are particularly preferable.

The optimum amount of the modifier to be used in the invention is varied depending upon the kind of the modifiers, the kind and amount of the catalysts, and the kind and amount of fed monomers, and cannot be limited generally. However, in general, the modifier is used in a molar ratio of the modifier to the component (B) of 1.00–0.001, preferably 0.50–0.001.

In the present invention, the addition order of the catalytic components (A) and (B) and the modifier into the polymerization system can be selected optionally. However, when a catalyst prepared by mixing and aging the components (A) and (B) in the absence of the conjugated polar vinyl monomer is used in a coplymerization, the resulting copolymer is apt to gel. Consequently, it is preferable that the components (A) and (B) are mixed at least in the presence of a conjugated polar vinyl monomer, and it is more preferable that the component (B) is complexed with a conjugated polar vinyl monomer. Particularly, at the copolymerization of butadiene and acrylonitrile, it is preferable that the component (B) is complexed with acrylonitrile and then used. This complex of the component (B) with acrylonitrile is relatively stable and homopolymerization of acrylonitrile hardly occurs, and therefore a mixture of the component (B) and acrylonitrile may be heated from room temperature to about 100° C. to promote the complex-forming reaction. However, care must be taken not to cause homopolymerization of conjugated polar vinyl monomers at the complexation of the component (B) with acrylonitrile. Even when the components (A) and (B) are mixed in the presence of a conjugated polar vinyl monomer, it is necessary that they are mixed under such a condition that the conjugated polar vinyl monomers do not homopolymerize.

The modifier of the invention can be added in any stage of mixing the catalytic components (A) and (B). For example, such an addition order that the component (B) and the modifier are previously mixed, and the resulting mixture is heated from room temperature to about 100° C. and aged, and the aged mixture of the component (B) and the modifier is reacted with a conjugated polar vinyl monomer, such as acryonitrile, can be used.

It is preferable that the component (B) of the invention is heat-treated at a temperature of from room temperature to about 400° C. under a reduced pressure of from normal pressure to 0.1 mm. Hg and then used. However, even if commercially available compounds are used as such, the object of the invention can be attained.

The copolymerization reaction can substantially be carried out by a bulk polymerization without the use of a diluent, and further carried out in a diluent which does not prevent the copolymerization reaction.

As such diluents, mention may be made of aromatic hydrocarbons, aliphatic hydrocarbons, alicyclic hydrocarbons, halogenated hydrocarbons, carbon halides and carbon disulfide, for example, tetrachloroethylene, carbon tetrachloride, dichlorobenzene, chlorobenzene, chloroform, butyl chloride, tetrachloroethane, trichloroethane, dichloroethane, dichloromethane, xylene, toluene, benzene, cyclohexane, propane, butane, pentane, hexane, heptane, octane, ligroin, petroleum ether and other petroleum mixed solvent and carbon disulfide, and their mixtures.

A ratio of the diluent to be used based on the monomer can be selected optionally.

The polymerization temperature is within the range of 0°–60° C., preferably 0°–50° C. For example, when butadiene and acrylonitrile are copolymerized at a temperature higher than 60° C., the degree of alternation of the resulting copolymer decreases, and the object of the invention cannot be attained. While, when the reaction is carried out at a temperature lower than 0° C., the activity of the catalyst of the invention decreases considerably.

The copolymerization reaction is carried out under a pressure from one determined by vapor pressure in the reaction system to 50 atm.

The copolymerization reaction is preferably carried out under an inert atmosphere, for example, nitrogen gas.

After the completion of the polymerization reaction, the after-treatment is carried out by conventional methods to purify and recover the copolymer. These methods include alcohol precipitation, alcohol washing, alcohol-hydrochloric acid washing, hydrochloric acid-water washing, ammonium hydroxide washing, ammonium chloride-containing ammonium hydroxide washing and the like. Furthermore, an after-treatment for the polymer obtained by a catalyst containing Lewis acid may be used. In addition, a process for separating and recovering the catalytic components by adding a compound capable of forming a complex with the catalytic component may be used.

The copolymers obtained by the method according to the present invention have various properties according to the combination of monomers, the kind, composition and amount of the catalyst, the monomer feed ratio and the other polymerization condition.

The composition, stereospecific property and arrangement of both monomer units in the obtained copolymers are confirmed by solubility, infrared absorption spectrum (hereinafter abridged as IR spectrum), nuclear magnetic resonance spectrum (hereinafter abridged as NMR spectrum), elementary analysis and the like. With respect to these points, an explanation will be exemplifying butadiene/acrylonitrile copolymer.

For a better understanding of the invention, reference is taken to the accompanying drawing, wherein:

FIG. 3 shows an enlarged NMR spectrum to be used for the determination of the degree of alternation of butadiene/acrylonitrile copolymer in the following Example 1.

(a) Solubility

Figure 1:
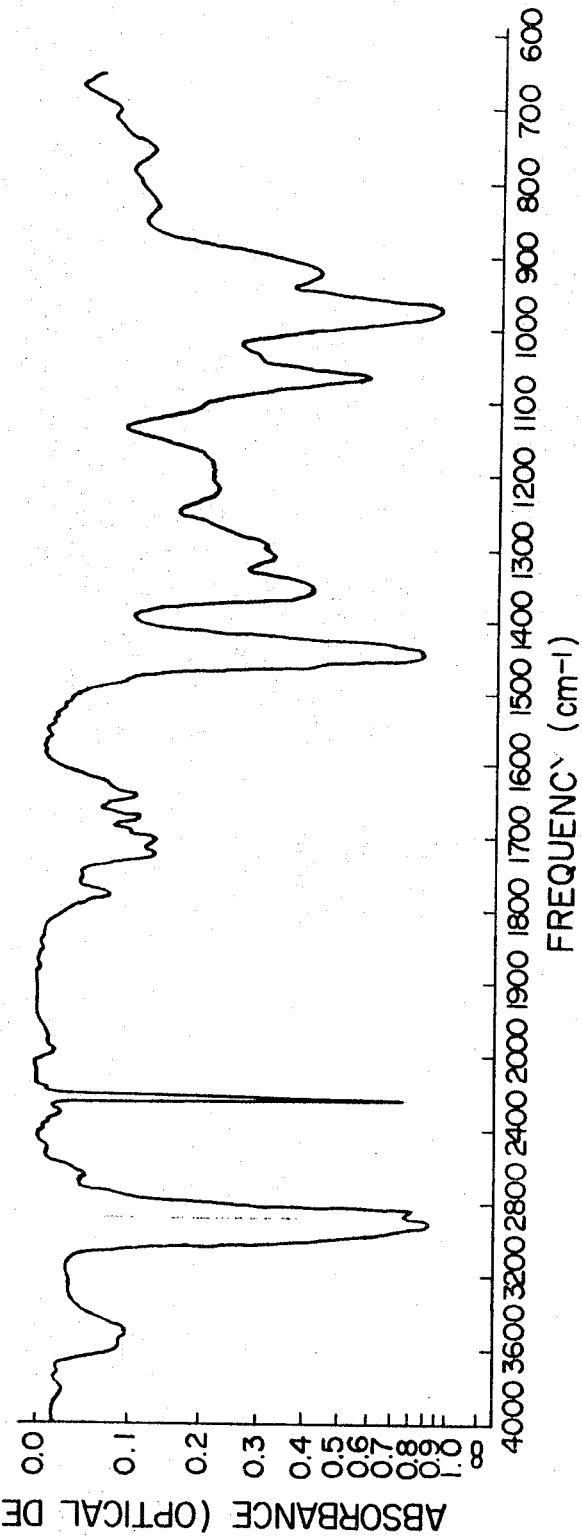
FIG. 1 shows an IR spectrum of butadiene/acrylonitrile copolymer obtained in the following Example 1.
Figure 2:
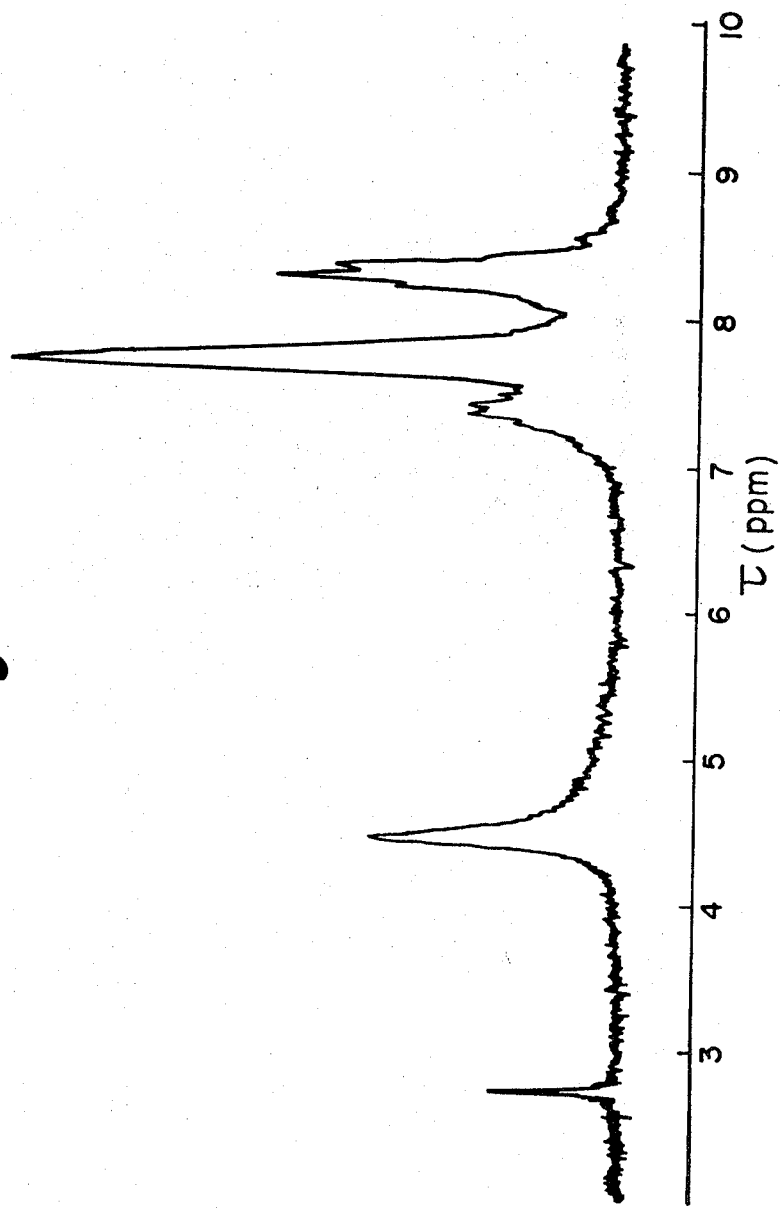
FIG. 2 shows a NMR spectrum of the same copolymer as in FIG. 1.

The acrylonitrile/butadiene copolymer obtained in the following Example 1 is soluble in dimethylformamide, tetrahydrofuran, acetonitrile, chloroform and the like but insoluble in hexane and toluene. This shows that said copolymer is considerably different from polyacrylonitrile insoluble in acetonitrile, tetrahydrofuran and chloroform and polybutadiene soluble in toluene. That is, the copolymer has a structure, which is considerably different from that of each homopolymer.

(b) IR spectrum

The butadiene/acrylonitrile copolymer obtained in the Example 1 was dissolved in chloroform, and the resulting solution was formed into a copolymer film on a rock salt plate and then IR spectrum of the copolymer film was measured. The characteristic absorption band of nitrile group in acrylonitrile unit and the characteristic absorption band of trans-1,4 bond in butadiene unit were distinctly observed at about 2,240 cm.$^{-1}$ and about 967 cm.$^{-1}$ respectively, but the characteristic absorption band of 1,2-bond in butadiene unit was very small and cis-1,4 bond in butadiene unit was not substantially observed.

Furthermore, the microstructure of butadiene unit in the copolymer of the invention was determined by IR spectrum. That is, a previously prepared concentrated solution of the copolymer in chloroform was formed into a thick copolymer film on a rock salt plate, and it was confirmed that the copolymer film had no absorption due to cis-1,4 bond in the range of 700–750 cm.$^{-1}$, thereby the content of cis-1,4 bond in the copolymer was found to be 0. Then, about 80 mg./10 ml. solution of the copolymer in bromoform was filled in a solution cell of 0.5 mm. thickness and an IR spectrum of the solution was measured, and the content of trans-1,4 bond and that of 1,2-bond were determined as follows.

In a separate experiment, the absorption coefficient of 1,2-bond, which appears at about 910 cm.$^{-1}$, had been previously determined to be 0.01887. The content of 1,2-bond in the sampled copolymer calculated with the use of the above absorption coefficient. Further, the content of acrylonitrile unit in the sampled copolymer was determined from a previously measured elementary analysis value. The content of trans-1,4 bond of the sampled copolymer, the absorption of which appeared at about 967 cm.$^{-1}$, was calculated by subtracting the above determined content of 1,2-bond and the above determined content of acrylonitrile unit from the total amount of the sampled copolymer. Then, the thus calculated content of 1,2-bond and that of trans-1,4 bond in the sampled copolymer were totaled and percentages of the content of trans-1,4 bond and that of 1,2-bond were determined.

It was found from the above-mentioned method that the copolymer obtained in Example 1 contained 97.5% of trans-1,4 bond, and 2.5% of 1,2-bond. Furthermore, it was found that copolymers obtained even by different polymerization conditions gave always the same IR spectrum and that the method of the invention provides copolymers, wherein the butadiene unit had a microstructure of substantially complete trans-1,4 bond.

(c) NMR spectrum

The butadiene/acrylonitrile copolymer obtained in the invention was dissolved in deuterochloroform to prepare a solution having about 10% by weight concentration. The NMR spectrum of the solution was measured at 60° C. with the use of tetramethylsilane as an internal standard material by means of a J.N.M.–4H–100 type NMR spectrometer made by Japanese Electron Optics Laboratory Co., Ltd.

An information with respect to the degree of alternation, which was one of the most important factors for the alternating copolymer obtained in the invention, was obtained by analysing the NMR spectrum.

The "degree of alternation" of a copolymer relates to the arrangement of monomer units in the copolymer, and is shown by the ratio of the number of bonds between acrylonitrile unit and butadiene unit to the total number of bonds between monomer units in an alternating copolymer. This "degree of alternation" is shown by the following formula $$F_{AB}=[AB]\times 100/([AA]+[AB]+[BB])$$

In the formula, $F_{AB}$ represents "degree of alternation," and [AB], [AA] and [BB] represent the number of bonds between acrylonitrile unit and butadiene unit, that between acrylonitrile unit and acrylonitrile unit, and that between butadiene unit and butadiene unit in the copolymer, respectively.

The chemical shift of typical proton assigned to the bond between the above-mentioned monomer units can be found by the analysis of the NMR spectrum. As a key band for the bond between acrylonitrile unit and acrylonitrile unit, a chemical shift at $7.15\tau$ assigned to methine proton adjacent to the acrylonitrile unit is selected. As a key band for the bond between butadiene unit and acrylonitrile unit, a chemical shift at $7.72\tau$ assigned to methylene proton of butadiene unit adjacent to the acrylonitrile unit is selected. As a key band for the bond between butadiene unit and butadiene unit, a chemical shift at $7.90\tau$ assigned to methylene proton adjacent to the butadiene unit is selected. Then, the area of each key band is determined from the measured NMR spectrum based on the above assignment by using a Du Pont 310 Curve Resolver, and [AA], [AB] and [BB] were calculated according to the following formulae, respectively.

$$[AA]=kS_{AA}$$
$$[AB]=kS_{AB}/2$$
$$[BB]=kS_{BB}/4$$

In the above formulae, $S_{AA}$: area of methine proton at a key band of $7.15\tau$,
$S_{AB}$: area of methylene proton at a key band of $7.72\tau$, and
$S_{BB}$: area of methylene proton at a key band of $7.90\tau$.

The degree of alternation $F_{AB}$ can be easily calculated from the above obtained [AA], [AB] and [BB].

It was found from the above-mentioned analysis that the copolymer obtained in Example 1 had a degree of alternation of 90.0%, and was an alternating copolymer in which acrylonitrile unit and butadiene unit were bonded in a high degree of alternation.

On the other hand, when the degree of alternation of copolymers having a nitrile content of about 50 mole percent and prepared in a polymerization process by using a conventional radical initiator was determined by NMR spectrum, the degree of alternation was 76–81%, although it was varied depending upon the copolymerization condition. Therefore, this degree of alternation of the conventional copolymer is considerably lower than that of the copolymer obtained in the present invention.

(d) Elementary analysis

As a method of determining the composition of a copolymer, the measurement of the contents of elements constituting the copolymer have been commonly used. The composition of a butadiene/acrylonitrile copolymer obtained in the invention was determined from the nitrogen content of the copolymer.

As a method of copolymerizing butadiene with acrylonitrile, the use of a free radical initiator has been known. In this copolymerization reaction, the composition of the copolymer is determined by a probability limited by monomer feed ratio, the monomer reactivity ratio and the like.

Therefore, in the same combination of monomers, the composition of the copolymer generally is varied by changing the monomer feed ratio. Accordingly, the distinction of an alternating copolymer of the present invention and a random copolymer obtained by using a free radical initiator can be attained by observing the variation of the composition of the copolymer corresponding to the variation of the fed monomers or comparing the found value and the theoretical value of the composition of the copolymer in free radical copolymerization reaction.

By this method, it has been found that the composition of the copolymer obtained by the present invention has no relation to the theoretical value of the free radical copolymer and has substantially always 1:1 composition (molar ratio). Therefore, it has been supported that the copolymer has an alternating copolymer composition.

Structures of copolymers obtained by the other combinations of monomers were analysed from a relation between the composition of the copolymer determined by the elementary analysis and the monomer feed ratio, solubility and IR spectrum. As the result, it has been found that alternating copolymer can be produced by using a catalyst of the present invention.

As described above, according to the present invention, alternating copolymers having various monomers units can be produced.

The alternating copolymers have very wide utilization ranging from resin to rubber depending upon the combination of monomers and the monomer composition. For example, they can be used for materials for anti-shock resin, materials for generally used resin, materials for rubbery composition, adhesive, fiber, film, compound, latex, paint, surface treating agent, etc.

The following examples are given in illustration of this invention and are not intended as limitations thereof.

In the examples, the yield is calculated from the theoretical yield of a copolymer, wherein the donor monomer unit (conjugated diene unit) and the acceptor monomer unit (conjugated polar vinyl monomer unit) are contained in a molar ratio of 1:1.

EXAMPLE 1

An eggplant type flask of 1 l. capacity was thoroughly deaired, dried and filled with purified nitrogen. Into the flask were charged 163.55 g. (1.2 moles) of zinc chloride and heated to fuse at 350° C. The fused zinc chloride was dried under a reduced pressure of 1 mm. Hg for about 30 minutes and cooled to room temperature, which was added with 790 ml. (12 moles) of acrylonitrile and the resulting mixture was stirred by means of a magnetic stirrer. Heat was generated by the reaction of acrylonitrile with zinc chloride and the temperature of the reaction system was raised to about 60° C. Although the stirring was continued for 1 hour, the reaction system was not clear and contained a small amount of white fine particles in a suspended state. The thus obtained zinc chloride-acrylonitrile complex solution was used in the experiments as described hereinafter.

A polymerization bottle of 100 ml. capacity was thoroughly deaired, dried and filled with purified nitrogen. Into the bottle was charged 0.3553 g. (1 mmole) of manganese (III) triacetylacetonate, and then the reaction system was cooled to −78° C. and added with 16.45 ml. (250 mmoles) of acrylonitrile dried on 4A type molecular sieve, 13.16 ml. of said zinc chloride-acrylonitrile complex solution (zinc chloride: 20 mmoles, acrylonitrile: 158 mmoles), and further 7.6 ml. (100 mmoles) of butadiene at −78° C., after which the bottle was closed tightly and rotated in a polymerization bath a 30° C. for 2 hours to effect a copolymerization reaction.

The viscosity increased with lapse of the polymerization time, but the reaction system was liquid to the end. The reacion system was added with a large amount of 5% mehanol solution of 2,6-di-tert-butyl-p-cresol to stop the reaction and to precipitate a copolymer. The drying was effected in a conventional vacuum drying method. The yield of the obtained copolymer was 41.9% and the copolymer was a tough rubbery elastomer. The copolymer was completely dissolved in dimethylformamide, chloroform, tetrahydrofuran, acetonitrile and nitrobenzene and contained no gel (insoluble part in dimethylformamide).

The obtained copolymer was purified by repeating a reprecipitating method, wherein said copolymer was dissolved in chloroform and precipitated in methanol, and used for the following analysis.

The intrinsic viscosity of the copolymer in dimethylformamide at 30° C. was 1.29.

The copolymer was dissolved in deuterochloroform and NMR spectrum of the copolymer was measured at 100 megacycles. The obtained spectrum was analysed by the aforementioned method and it was found that the degree of alternation ($F_{AB}$) was 90.0%. Furthermore, it was found from the simplicity and the sharpness of NMR spectrum that the contents of 1,2-bond and —C≡N— bond were small. Moreover, according to the elementary analysis, found value of carbon was 78.34%, that of hydrogen 8.38% and that of nitrogen 13.28%, and the composition of the copolymer measured from these found values was found to be 50.8 mole percent of acrylonitrile unit and 49.2 mole percent of butadiene unit, so that it was supported that the copolymer had substantially an alternating copolymerization configuration.

Moreover, the copolymer was dissolved in chloroform and formed into a film on a rock salt plate, and then IR spectrum of the copolymer was measured. As the result, it was found that the absorption of cis-1,4 bond in the butadiene unit was not observed between 700 cm.$^{-1}$ and 750 cm.$^{-1}$. Furthermore, it was found from IR spectrum of the bromoform solution of the copolymer that the miscrostructure value in the butadiene unit was 97.5% of trans-1,4 bond and 2.5% of 1,2-bond.

EXAMPLES 2–10

A series of copolymerization experiments was made according to the following recipe, in which the zinc chloride-acrylonitrile complex solution used was the same as described in Example 1 and the molar ratio of butadiene and acrylonitrile to be fed was varied. In this case, the zinc chloride-acrylonitrile complex solution was cooled to −78° C. and added with a given amount of an additional acrylonitrile and further a given amount of butadiene and acrylonitrile solution of 0.005 mole/l. of manganese (III) triacetylacetonate, after which the bottle was closed tightly. The bottle was rotated in a polymerization bath at 40° C. for 15 minutes to effect a copolymerization reaction. An after-treatment, drying and the like of the resulting copolymer were effected according to the same manner as described in Example 1.

Recipe

Zinc chloride/acrylonitrile (molar ratio) ____ 0.05
Manganese(III)triacetylacetonate/zinc chloride
 (molar ratio) _____ 0.001
Butadiene _____ Variable
Acrylonitrile _____ Variable

TABLE 1

| Example number | Mole percent of fed acrylonitrile | Conversion (percent) | Composition of copolymer[1] (mole percent) | |
|---|---|---|---|---|
| | | | Acrylonitrile | Butadiene |
| 2 | 10 | 22.6 | 48.5 | 51.5 |
| 3 | 20 | 19.0 | 48.2 | 51.8 |
| 4 | 30 | 15.0 | 49.2 | 50.8 |
| 5 | 40 | 13.4 | 47.5 | 52.5 |
| 6 | 50 | 14.7 | 47.5 | 52.5 |
| 7 | 60 | 18.0 | 48.7 | 51.3 |
| 8 | 70 | 31.7 | 47.4 | 52.6 |
| 9 | 80 | 46.1 | 49.9 | 50.1 |
| 10 | 90 | 83.5 | 52.0 | 48.0 |

[1] Calculated from elementary analytical values.

As seen from Table 1, even if the molar ratio of butadiene to acrylonitrile to be fed is varied widely, the composition of the resulting copolymer does not change and the copolymers having a molar ratio of butadiene unit to acrylonitrile unit of substantially 1:1 are obtained. Accordingly, it can be seen that the present method produces an alternating copolymer different from that produced by a conventional method using a free radical initiator. The monomer reactivity ratio, which was calculated from mole percent of fed acrylonitrile and mole percent of acrylonitrile unit in the resulting copolymer by means of Fineman-Ross method (J. Polymer Sci., vol. V., No. 2, 259 (1950)), was $\gamma_1$ (acrylonitrile)=0.010 and $\gamma_2$ (butadiene)=0.099.

EXAMPLE 11

Into a bottle was charged 2.726 g. (20 mmoles) of commercially available zinc chloride and further 26.3 ml. (400 mmoles) of acrylonitrile under a nitrogen atmosphere, and thereafter the bottle was added with 7.6 ml. (100 mmoles) of butadiene at about −60° C. and 0.3553 g. (1 mmole) of manganese (III) triacetylacetonate. The bottle was rotated in a polymerization bath at 25° C. for 40 minutes to effect a copolymerization reaction. The polymerization product was treated according to the same manner as described in Example 1 to obtain a copolymer in a yield of 54.3%. The copolymer was a rubbery elastomer. The composition of the copolymer according to the elementary analysis was 51.2 mole percent of acrylonitrile unit and 48.8 mole percent of butadiene unit, the intrinsic viscosity was 1.27, and the degree of alternation measured from NMR spectrum was 86.0%.

EXAMPLE 12

In a beverage bottle, 4.504 g. (20 mmoles) of zinc bromide was dried at room temperature under a reduced pressure of 0.1 mm. Hg for 30 minutes, and 26.3 ml. (400 mmoles) of acrylonitrile was added thereto, and then the polymerization system was cooled to −78° C. and added with 7.6 ml. (100 mmoles) of butadiene and 0.3553 g. (1 mmole) of manganese (III) triacetylacetonate. After shaken, the bottle was rotated in a polymerization bath at 25° C. for 50 minutes to effect a copolymerization reaction. Though the viscosity of the reaction system increased with the proceeding of the copolymerization reaction, this reaction was a solution polymerization to the end. The yield of the obtained rubbery copolymer was 23.4%, the intrinsic viscosity was 1.35, and the composition of the copolymer was 51.1 mole percent of acrylonitrile unit and 48.9 mole percent of butadiene unit. The degree of alternation measured from NMR spectrum was 88.7%.

EXAMPLE 13

In a beverage bottle, 4.504 g. (20 mmoles) of zinc bromide was dried at room temperature under a reduced pressure of 0.1 mm. Hg for 30 minutes, and added with 26.3 ml. (400 mmoles) of acrylonitrile and further 7.8 mg. (0.02 mmole) of iodoform, and the resulting mixture was thoroughly mixed while shaking (the molar ratio of iodoform to zinc bromide was 0.001). Then, the reaction system was cooled to −78° C. and added with 7.6 ml. (100 mmoles) of butadiene and 0.3553 g. (1 mmole) of manganese (III) triacetylacetonate, after which the reaction system was rotated in a polymerization bath at 25° C. for 50 minutes to effect a copolymerization reaction. Though the viscosity of the reaction system increased with the proceeding of the copolymerization reaction, this reaction was a solution polymerization to the end. The yield of the obtained rubbery copolymer was 20.0%, the intrinsic viscosity was 1.16, and the composition of the copolymer was 50.8 mole percent of acrylonitrile unit and 49.2 mole percent of butadiene unit. The degree of alternation measured from NMR spectrum was 89.0%.

Comparison of this example with Example 12 shows that the addition of iodoform lowers the yield slightly and lowers the molecular weight of the resulting copolymer (expressed by the intrinsic viscosity), that is, iodoform has an effect for controlling the molecular weight. Furthermore, the degree of alternation in the obtained alternating copolymer is not substantially varied by the addition of iodoform.

EXAMPLE 14

In a beverage bottle, 0.2552 g. (1 mmole) of manganese (II) diacetylacetonate, 13.16 ml. of the zinc chloride-acrylonitrile complex solution as prepared in Example 1 ($ZnCl_2$: 20 mmoles, acrylonitrile: 158 mmoles) and 16.45 ml. (250 mmoles) of acrylonitrile, were mixed and cooled to −78° C. The bottle was charged with 7.6 ml. (100 mmoles) of butadiene, shaken and closed tightly. A copolymerization reaction was effected at 40° C. for 24 hours to obtain a copolymer in a yield of 29.0%. The composition of the copolymer according to the elementary analysis was 51.8 mole percent of acrylonitrile unit and 48.2 mole percent of butadiene unit.

EXAMPLE 15

A copolymerization experiment was made in the same manner as described in Example 14 except that 0.5035 g. (1 mmole) of manganese (II) benzoylacetophenone complex was used instead of manganese (II) diacetylacetonate. The yield of the obtained copolymer was 14.5% and the composition of the copolymer was 51.4 mole percent of acrylonitrile unit and 48.6 mole percent of butadiene unit.

EXAMPLE 16

A copolymerization reaction was effected at 30° C. for 2 hours according to the same manner as described in Example 14 except that 0.3593 g. (1 mmole) of cobalt (III) triacetylacetonate was used as a metal chelate complex compound, whereby a rubbery copolymer was obtained in a yield of 6.9%. The composition of said copolymer was 50.3 mole percent of acrylonitrile unit and 49.7 mole percent of butadiene unit, and the degree of alternation measured from NMR spectrum was 95.5%.

EXAMPLE 17

In a beverage bottle, 0.1317 g. (0.5 mmole) of copper (II) diacetylacetonate as a metal chelate complex compound was added with 6.58 ml. of the same zinc chloride-acrylonitrile complex solution as prepared in Example 1 (zinc chloride: 10 mmoles, acrylonitrile: 79 mmoles) and 23.03 ml. (350 mmoles) of acrylonitrile, and further added with 7.6 ml. (100 mmoles) of butadiene at −78° C., after which the bottle was closed tightly and rotated at 40° C. for 210 minutes to effect a copolymerization reaction.

The yield of the obtained green rubbery copolymer was 2.3%, and the composition of the copolymer was 51.7 mole percent of acrylonitrile unit and 48.3 mole percent of butadiene unit.

EXAMPLES 18–20

A beverage bottle was deaired, dried and filled with gaseous nitrogen. Into the bottle was charged 0.34 g. (2.5 mmoles) of zinc chloride and dried at 300° C. under a reduced pressure of 1 mm. Hg for 30 minutes. To the dried zinc chloride were added 100 mmoles of various conjugated polar vinyl monomers at −78° C. and further 100 mmoles of a conjugated diene. The resulting mixture was mixed and added with 2.5 ml. of toluene solution of 0.1 mole/l. of manganese (III) triacetylacetonate, after which the bottle was closed tightly and a copolymerization reaction was effected at 40° C. All the copolymers obtained in Examples 18 to 20 were rubbery, and it was confirmed from IR spectrum that the copolymer contained both monomer units. Thereafter, the composition of the copolymer was calculated from an elementary analytical value of nitrogen in the case of the copolymer having nitrile group or from an elementary analytical value of oxygen in the case of the copolymer having carbonyl group, which was obtained by subtracting elementary analytical values of carbon and hydrogen from 100. The obtained results are shown in the following Table 2.

TABLE 2

| Example number | Conjugated polar vinyl monomer | Conjugated diene | Polymerization time (hr.) | Yield (percent) | Composition of copolymer (mole percent) | |
|---|---|---|---|---|---|---|
| | | | | | Conjugated diene | Conjugated polar vinyl monomer |
| 18 | Acrylonitrile | Pentadiene-1,3 | 48 | 9.3 | 50.1 | 49.9 |
| 19 | do | 2,3-di-methylbutadiene-1,3 | 5 | 13.1 | 50.5 | 49.5 |
| 20 | Methacrylonitrile | Butadiene | 5 | 15.7 | 51.6 | 48.4 |

EXAMPLE 21

In a beverage bottle, 0.3553 g. (1 mmole) of manganese (III) triacetylacetonate was cooled to −78° C. and added with 13.16 ml. of the zinc chloride-acrylonitrile complex solution as prepared in Example 1 (zinc chloride: 20 mmoles, acrylonitrile: 158 mmoles), 16.45 ml. (250 mmoles) of acrylonitrile and 0.2 ml. of acrylonitrile solution of 0.1 mole/l. of iodoform (iodoform 0.02 mmole), and the resulting mixture was mixed thoroughly. Then, 10.0 ml. (100 mmoles) of isoprene were added to the mixture, and the bottle was shaken, closed tightly and rotated at 40° C. for 1 hour to effect a copolymerization reaction. Though the viscosity increased with the proceeding of the reaction, the polymerization system was a fluidity to the end. The thus obtained copolymer was tough and rubbery and contained no gel. The yield of the copolymer was 66.6%, the intrinsic viscosity was 1.17, and the composition of the copolymer was 50.99 mole percent of acrylonitrile unit and 49.01 mole percent of isoprene unit. The existence of both monomer units was confirmed from IR spectrum and NMR spectrum.

EXAMPLES 22–24

A copolymerization reaction was effected by using 1.09 g. (8 mmoles) of zinc chloride, 100 mmoles of a conjugated polar vinyl monomer, 2 times volume of toluene based on the total volume of monomers, 100 mmoles of a conjugated diene and 4 ml. of toluene solution of 0.1 mole/l. of manganese (III) triacetylacetonate at 40° C. for 24 hours according to the same manner as described in Example 20. All the obtained copolymer in Examples 22 to 24 were rubbery and it was found from IR spectrum that the copolymer contained both monomer units. The composition of the copolymer was measured from elementary analysis. The obtained results are shown in the following Table 3.

TABLE 3

| Ex. No. | Conjugated polar vinyl monomer | Conjugated diene | Conversion (percent) | Conjugated diene unit in copolymer (mole percent) |
|---|---|---|---|---|
| 22 | Methyl methacrylate | Butadiene | 8.4 | 50.4 |
| 23 | Ethyl methacrylate | do | 6.5 | 52.9 |
| 24 | Methyl methacrylate | Isoprene | 4.2 | 52.6 |

EXAMPLES 25–27

Into a polymerization bottle were charged 0.788 g. (2 mmoles) of iodoform, 4 ml. of acrylonitrile solution of 0.1 mole/l. of manganese (III) triacetylacetonate (manganese (III) triacetylacetonate; 0.4 mmole), an additional amount of acrylonitrile and 8 ml. of acrylonitrile solution of 1 mole/l. zinc chloride-acrylonitrile complex prepared in the similar manner to Example 1 (zinc chloride: 8 mmoles) and further a given amount of butadiene at −78° C., after which the bottle was closed tightly and rotated in a polymerization bath at 40° C. for 4.5 hours to effect a copolymerization reaction.

The obtained copolymer was a rubbery polymer containing no gel and the analysed results of the copolymer are shown in the following Table 4.

TABLE 4

| Example number | Acrylonitrile (mmole) | Butadiene (mmole) | Conversion (percent) | Acrylonitrile unit in copolymer (mole percent) | Degree of alternation (percent) |
|---|---|---|---|---|---|
| 25 | 200 | 200 | 23.8 | 47.9 | 94.0 |
| 26 | 240 | 160 | 12.1 | 47.9 | 93.1 |
| 27 | 280 | 120 | 5.6 | 47.9 | 90.0 |

EXAMPLES 28–30

A copolymerization reaction was effected at 25° C. by using 100 mmoles of acrylonitrile, 100 mmoles of butadiene, 4 mmoles of zinc chloride, 0.2 mmole of manganese (III) triacetylacetonate and 1 mmole of iodoform according to the same manner as described in Example 25. The results are shown in Table 5.

TABLE 5

| Example No. | Polymerization time (hrs.) | Conversion (percent) | Acrylonitrile unit in copolymer (mole percent) | Degree of alternation (percent) |
|---|---|---|---|---|
| 28 | 1 | 6.8 | 49.7 | 95.1 |
| 29 | 17 | 41.2 | 47.7 | 91.1 |
| 30 | 60 | 60.0 | 47.3 | 90.0 |

The obtained copolymer was the rubbery elastomer containing no gel. The degree of alternation slightly lowered with the increase of the yield. Furthermore, it can be seen that by the addition of iodoform a copolymer containing no gel is obtained even under such a condition that gel is substantially formed by the use of a catalyst system compound only of the components (A) and (B) according to the present invention.

EXAMPLES 31–33

An acrylonitrile solution of 1 mole/l. zinc chloride-acrylonitrile complex was prepared according to the same manner as described in Example 1 and used in the following experiment.

An effect of an amount of iodoform to be added was examined with the use of the following recipe.

Recipe

Acrylonitrile—320 mmoles
Butadiene—80 mmoles
Zinc chloride—16 mmoles
Manganese (III) triacetylacetonate—0.16 mmoles
Iodoform—variable
Polymerization temperature—30° C.

TABLE 6

| Example number | $CH_3I/ZnCl_2$ (molar ratio) | Polymerization time (hrs.) | Conversion (percent) | Acrylonitrile unit in copolymer (mole percent) | Degree of alternation (percent) | $[\eta]$ [1] (dl./g.) |
|---|---|---|---|---|---|---|
| 31 [1] | 0.01 | 2 | 32.8 | 51.9 | 88.1 | 0.89 |
| 32 [2] | 0.1 | 20 | 28.6 | 51.3 | 87.5 | 0.22 |
| 33 [3] | 1.0 | 24 | 25.3 | 49.9 | | 0.09 |

[1] Intrinsic viscosity measured in dimethylformamide at 30° C.
[2] Additional order=1 mole/l. zinc chloride-acrylonitrile complex solution—acrylonitrile—butadiene—acrylonitrile solution of 0.1 mole/l. of manganese (III) triacetylacetonate—acrylonitrile solution of 0.1 mole/l. of iodoform.
[3] Addition order=The above addition order is repeated, except adding a solid iodoform firstly.

The obtained copolymer was a rubbery product containing no gel. It was found that the molecular weight lowers as the amount of iodoform increases. Furthermore, the copolymer obtained in Example 33, in which the molar ratio of iodoform to zinc chloride was 1.0, was liquid.

EXAMPLES 34–36

An effect of polymerization temperatures was examined according to the same recipe as described in Example 31. The results are shown in Table 7.

TABLE 7

| | Polymerization | | Conversion (percent) | Acrylonitrile unit in copolymer (mole percent) | Degree of alternation (percent) | $[\eta]$ |
|---|---|---|---|---|---|---|
| | Temperature (° C.) | Time (hrs.) | | | | |
| Example No.: | | | | | | |
| 34 | 0 | 20 | 12.2 | 52.3 | | 0.74 |
| 35 | 20 | 3 | 22.6 | 51.9 | 87.4 | 0.66 |
| 36 | 30 | 3 | 31.9 | 52.0 | 87.4 | 0.79 |
| Comparative Example 1 | 80 | 0.25 | 23.4 | 53.1 | 83.9 | 0.64 |

It can be seen from Table 7 that by raising the polymerization temperature above 80° C., only a random copolymer is obtained even in the same recipe.

EXAMPLES 37–40

A series of experiments was made on the amount of manganese (III) triacetylacetonate to be used.

Into a polymerization bottle were charged manganese (III) triacetylacetonate and then charged acrylonitrile, solution of 1 mole/l. zinc chloride-acrylonitrile complex, butadiene and acrylonitrile solution of 0.1 mole/l. of iodoform in this order, and thereafter a copolymerization reaction was effected at 30° C. The recipe used was as follows.

Recipe

Acrylonitrile—320 moles
Butadiene—80 moles
Zinc chloride—16 moles
Iodoform—0.16 moles
Manganese (III) triacetylacetonate—variable was cooled to —78° C. and added with a given amount of butadiene and a given amount of acrylonitrile solution of 0.5 mole/l. of manganese (III) triacetylacetonate, after which the bottle was closed tightly and a copolymerization reaction was effected. The following two recipes were used:

Recipe I

| | Mmoles |
|---|---|
| Acrylonitrile | 400 |
| Butadiene | 100 |
| Zinc chloride | 20 |
| Manganese (III) triacetylacetonate | 0.4 |
| Modifier | Variable |

TABLE 8

| Example number | Mn(AA)₃*/ ZnCl₂ | Polymerization time (hrs.) | Conversion (percent) | Acrylonitrile unit in copolymer (mole percent) | Degree of alternation (percent) | [η] (dl./g.) |
|---|---|---|---|---|---|---|
| 37 [1] | 0.2 | 1.5 | 20.7 | 50.7 | | 0.42 |
| 38 [1] | 0.05 | 1.5 | 29.1 | 51.6 | | 0.57 |
| 39 [2] | 0.005 | 2.0 | 17.5 | 51.3 | 87.3 | 0.74 |
| 40 [2] | 0.0001 | 5.0 | 9.5 | 52.3 | 88.7 | 0.68 |

*Manganese (III) triacetylacetonate.
[1] Addition of Mn(AA)₃* in a form of solid.
[2] The use of acrylonitrile solution of 0.1 mole/l. of Mn(AA)₃*.

EXAMPLE 41

An experiment was made by using a large amount of zinc chloride.

Into a polymerization bottle were charged 8.45 g. (64 mmoles) of zinc chloride and dried at about 350° C. under a reduced pressure of 1 mm. Hg for about 30 minutes, to which were added 17.84 ml. of acrylonitrile and the resulting mixture was reacted while shaking for about 1 hour. The reaction product was cooled to —78° C. and added with 6.1 ml. (80 mmoles) of butadiene, 1.6 ml. of acrylonitrile solution of 0.1 mole/l. of manganese (III) triacetylacetonate (manganese (III) triacetylacetonate: 0.16 mmole) and 1.6 ml. of acrylonitrile solution of 0.1 mole/l. of iodoform (iodoform: 0.16 mmole), after which the bottle was rotated in a polymerization bath at 30° C. for 2 hours to effect a copolymerization reaction.

The yield of the obtained copolymer was 23.4% and the copolymer contained no gel. Furthermore, the degree of alternation measured from NMR spectrum was 91.3% and the microstructure value in the butadiene unit from IR spectrum was 96.0% of trans-1,4 bond.

EXAMPLES 42–49

A series of experiments was made by using various thiol compounds as a modifier.

Into a polymerization bottle were charged a given amount of thiol compound and a solution of 1 mole/l. zinc chloride-acrylonitrile complex as prepared in Example 1 and further acrylonitrile. The reaction system Recipe II

| | Mmoles |
|---|---|
| Acrylonitrile | 200 |
| Butadiene | 200 |
| Zinc chloride | 12 |
| Manganese (III) triacetylacetonate | 0.3 |
| Modifier | Variable |

TABLE 9

| Example number | Recipe No. | Modifier Kind | Modifier Mmole | Polymerization Temperature (°C.) | Polymerization Time (min.) | Conversion (percent) | Acrylonitrile unit in copolymer (mole percent) | Degree of alternation (percent) | [η] (dl./g.) |
|---|---|---|---|---|---|---|---|---|---|
| 42 | 1 | Tert-dodecane thiol | 8.0 | 30 | 305 | 16.8 | 50.3 | 89.7 | 0.64 |
| 43 | 1 | n-Dodecane thiol | 1.0 | 40 | 90 | 42.5 | 50.8 | 87.0 | 0.84 |
| 44 | 1 | n-Hexadecane thiol | 1.0 | 40 | 120 | 7.4 | 50.7 | | 1.94 |
| 45 | 2 | Thiolactic acid | 0.9 | 30 | 430 | 22.2 | 50.4 | 95.0 | 1.14 |
| 46 | 2 | Tert-butane thiol | 1.8 | 30 | 360 | 34.7 | 49.1 | 94.1 | 1.33 |
| 47 | 2 | n-Butane thiol | 1.8 | 30 | 240 | 32.3 | 49.6 | 94.5 | 0.94 |
| 48 | 2 | Thiomalacic acid | 0.9 | 30 | 240 | 32.5 | 49.2 | | 1.41 |
| 49 | 2 | Thioacetic acid | 2.4 | 30 | 180 | 17.5 | 52.3 | 92.1 | 0.71 |

When a copolymerization reaction was effected under a condition of recipe I or II without using a modifier, the reaction proceeded in an extremely high activity, but the obtained copolymer was substantially insoluble in dimethylformamide and was a gelated polymer. On the other hand, the copolymers obtained in Examples 42 to 49 were rubbery and contained substantially no gel. Furthermore, the obtained copolymer had a degree of alternation of more than 87%.

EXAMPLES 50–59

A series of experiments was made by using various diluents.

Into a polymerization bottle were charged 78 mg. (0.2 mmole) of iodoform, 20 ml. of a solution of 1 mole/l. zinc chloride-acrylonitrile complex as prepared in Example 1 (zinc chloride: 20 mmoles), 6.0 ml. of acrylonitrile and 0.5 time volume of various diluents based on the total volume of monomers (total amount of acrylonitrile and butadiene), and the reaction system was cooled to —78° C. and added with 7.6 ml. (100 mmoles) of butadiene and 0.4 ml. of acrylonitrile solution of 0.5 mole/l. of manganese (III) triacetylacetonate (manganese (III) triacetylacetonate: 0.2 mmole), after which the bottle was closed tightly and rotated in a polymerization bath at 30° C. to effect a copolymerization reaction. The obtained copolymer was rubbery and the results are shown in the following Table 10.

When a copolymerization was effected for 2 hours without using a diluent, the yield was about 35%. Accordingly, it can be seen that said copolymerization reaction was accelerated by using the diluent, such as toluene, benzene, hexane and the like. Furthermore, the similar result was obtained in the experiment with the use of cyclohexane.

amount of each component used is the same as in Example 1 on the mole.

TABLE 13

| Comparative Example No. | Metal halide | Polymerization Temperature (° C.) | Time (hrs.) | Conversion (percent) |
|---|---|---|---|---|
| 6 | | 30 | 21 | 0 |
| 7 | Aluminum trichloride | 30 | 21 | 1.1 |
| 8 | Stannic chloride | 30 | 0.5 | 1.2 |
| 9 | do | 60 | 4 | 2.9 |

TABLE 10

| Example No. | Diluent | Polymerization time (min.) | Conversion (percent) | Acrylonitrile unit in copolymer (mole percent) | Degree of alternation (percent) | $[\eta]$ (dl./g.) |
|---|---|---|---|---|---|---|
| 50 | Toluene | 30 | 35.8 | 51.4 | | 1.34 |
| 51 | Benzene | 30 | 35.5 | 51.8 | | |
| 52 | 1,2-dichloroethane | 70 | 50.2 | 51.8 | | |
| 53 | 1,2,2-trichloroethane | 120 | 56.9 | 50.9 | | |
| 54 | 1,1,2,2-chloroethane | 150 | 30.4 | 52.5 | 87.2 | 0.80 |
| 55 | o-Dichlorobenzene | 30 | 29.1 | 50.4 | 87.0 | 1.09 |
| 56 | Chlorobenzene | 150 | 45.1 | 51.3 | 88.1 | 1.07 |
| 57 | Dichloromethane | 30 | 27.4 | 51.4 | 91.1 | 1.32 |
| 58 | Hexane | 30 | 75.9 | 53.1 | | |
| 59 | Chloroform | 30 | 27.8 | 51.3 | 94.1 | 1.21 |

EXAMPLES 60–62

According to the same manner as described in Example 20, 400 mmoles in total of conjugated polar vinyl monomers were added to 2.73 g. (20 mmoles) of zinc chloride at −78° C., and further 100 mmoles of conjugated diene and 0.3553 g. (1 mmole) of manganese (III) triacetylacetonate were added, after which the bottle was closed tightly and rotated at 25° C. for 30 minutes to effect a copolymerization reaction. The composition of the obtained copolymer was measured from elementary analysis. The results are shown in the following Table 11.

It can be seen from Table 13 that the copolymerization reaction does not proceed at all under the condition of the present invention with the use of manganese (III) triacetylacetonate alone, and that the copolymerization reaction does not substantially proceed even in the combination of manganese (III) triacetylacetonate with aluminum trichloride or stannic chloride known as typical Friedel-Crafts halides.

EXAMPLE 63

To 2.67 ml. of solution of 1.5 mole/l. zinc chloride-acrylonitrile complex as prepared in Example 1 (zinc

TABLE 11

| Example number | Conjugated diene ($M_1$) | Conjugated polar vinyl monomer Acrylonitrile ($M_2$) | The other ($M_3$) | Yield (g.) | Composition copolymer of (mole percent) $M_1$ | $M_2$ | $M_3$ |
|---|---|---|---|---|---|---|---|
| 60 | Butadiene | Acrylonitrile | n-Butylacrylate (50)[1] | 9.77 | 48.5 | 39.7 | 11.8 |
| 61 | do | do | Ethylacrylate (50)[1] | 8.82 | 47.6 | 42.2 | 10.2 |
| 62 | Isoprene | do | Ethylacrylate (100)[1] | 8.10 | 47.9 | 34.6 | 17.5 |

[1] The numerical value in bracket means mmoles of the monomer used.

Comparative Examples 2–5

A series of experiments was made by using various peroxy-compounds or azo-compounds instead of manganese (III) triacetylacetonate in Example 1 to obtain the result as shown in the following Table 12.

TABLE 12

| Comparative Example No. | Free radical initiator[1] | Conversion (percent) | Gel content (percent) |
|---|---|---|---|
| 2 | Dibenzoyl peroxide | Trace | |
| 3 | Azobis(isobutyronitrile) | Trace | |
| 4 | Tert-butyl peroxy pivalate | 9.5 | 65 |
| 5 | Cumene hydroperoxide | 9.2 | 58 |

[1] The same condition and manner as in Example 1 except using 1 mmole of a free radical initiator.

From the comparison of these comparative examples with Example 1, it can be seen that the catalyst composed of zinc halide and metal chelate complex compound according to the present invention has an excellent catalytic activity and is not liable to gelation.

Comparative Examples 6–9

A series of experiments was made by using aluminum trichloride or stannic chloride known as typical Friedel-Crafts halides instead of zinc chloride in Example 1. The chloride: 4 mmoles) were added 2.71 ml. of acrylonitrile and 0.4 ml. of acrylonitrile solution of 0.1 mole/l. of iodoform. The reaction system was cooled to −78° C. and added with 7.6 ml. (100 mmoles) of butadiene and 0.8 ml. of acrylonitrile solution of 0.1 mole/l. of manganese (III) triacetylacetonate (manganese (III) triacetylacetonate: 0.08 mmole), and then a copolymerization reaction was effected at 24° C. for 3 hours. The obtained copolymer contained substantially no gel and was a tough rubbery elastomer, and the yield was 20.9%. The intrinsic viscosity was 1.65, the content of acrylonitrile unit in the copolymer was 50.9 mole percent, the degree of alternation ($F_{AB}$) measured from NMR spectrum was 92.3% and the glass transition temperature was −15° C. From these facts it was confirmed that the copolymer had a substantially alternating copolymerization configuration.

EXAMPLE 64

A copolymerization reaction was effected at 24° C. for 2 hours according to the same manner as described in Example 63 except that 0.8 ml. of acrylonitrile solution of 0.1 mole/l. of iodoform was used. The obtained rubbery elastomer contained no gel, and the yield was 17.5%. The intrinsic viscosity was 0.89, the content of acrylonitrile unit in the copolymer was 49.6 mole percent, the degree of alternation ($F_{AB}$) was 91.3% and the glass transition temperature was —16° C.

What is claimed is:

1. A process for producing rubbery alternating copolymers of butadiene and acrylonitrile, wherein butadiene unit and acrylonitrile unit are bonded with a degree of alternation of more than 90%, which comprises copolymerizing butadiene and acrylonitrile in a molar ratio of acrylonitrile to butadiene of 1.00 to 2.33 at a temperature of 0° C. to 50° C. in a non-aqueous medium in the presence of a catalyst prepared from a component (A): at least one metal chelate complex compound having the general formula $$MeL_n$$ 

wherein Me represents manganese, $n$ represents the valence of Me and L represents a ligand selected from 1,3-dicarbonyl compounds, and a component (B): at least one zinc halide selected from the group consisting of zinc chloride and zinc bromide, the molar ratio of said component (B) to acrylonitrile being from 0.04 to 0.20, the molar ratio of said component (A) to said component (B) being from 0.1 to 0.0001, and in the presence of at least one modifier selected from the group consisting of thiol compounds and iodoform, the molar ratio of said modifier to said component (B) being from 1.00 to 0.001.

2. A process according to claim 1, wherein said component (A) is manganese (III) triacetylacetonate.

3. A process according to claim 1, wherein before copolymerization said component (B) is treated with a molar excess of acrylonitrile to form an acrylonitrile said component (B) complex and the solution of said complex in acrylonitrile is used in the copolymerization.

4. A process according to claim 1, wherein said thiol compound is aliphatic thiol compound having 1 to 20 carbon atoms.

5. A process according to claim 1, wherein said thiol compound is selected from the group consisting of tert-butanethiol, n-butanethiol, thiomalic acid, thiolactic acid, thioacetic acid, n-dodecanethiol, tert-dodecanethiol, n-hexadecanethiol and n-tetradecanethiol.

6. A process according to claim 1, wherein the molar ratio of said modifier to said component (B) is from 0.50 to 0.001.

References Cited

UNITED STATES PATENTS

| 3,078,260 | 2/1963 | Hayes | 260—83.5 |
| 3,278,503 | 10/1966 | Serniuk et al. | 260—82.5 |

FOREIGN PATENTS

| 1,176,864 | 4/1965 | Germany | 260—82.5 |
| 1,180,522 | 6/1965 | Germany | 260—82.5 |
| 1,181,913 | 7/1965 | Germany | 260—82.5 |
| 1,360,001 | 3/1964 | France | 260—82.5 |
| 1,487,211 | 5/1967 | France | 260—82.5 |

JOSEPH L. SCHOFER, Primary Examiner

S. M. LEVIN, Assistant Examiner

U.S. Cl. X.R.

260—32.6 A, 33.8 UA, 41.5 R, 80.7, 82.3, 83.5, 87.3, 94.3